(12) United States Patent
Hsueh et al.

(10) Patent No.: US 8,941,024 B2
(45) Date of Patent: Jan. 27, 2015

(54) GOUGING CARBON ROD

(71) Applicant: Taimatsu Tech. Co., Ltd., Keelung (TW)

(72) Inventors: Cheng Pin Hsueh, Keelung (TW); Ho Hsiang Hsieh, Keelung (TW); Wen Ping Yu, Keelung (TW); I Chun Chi, Keelung (TW)

(73) Assignee: Taimatsu Tech. Co., Ltd., Keelung (TW)

( * ) Notice: Subject to any disclaimer, the term of this patent is extended or adjusted under 35 U.S.C. 154(b) by 288 days.

(21) Appl. No.: 13/644,970

(22) Filed: Oct. 4, 2012

(65) Prior Publication Data

US 2014/0097156 A1    Apr. 10, 2014

(51) Int. Cl.
*B23K 35/02* (2006.01)
*B23K 35/22* (2006.01)
*B23K 9/013* (2006.01)

(52) U.S. Cl.
CPC ............ *B23K 35/0216* (2013.01); *B23K 35/228* (2013.01)
USPC ............................................. 219/69.1; 219/70

(58) Field of Classification Search
CPC .......... B23K 7/00; B23K 25/04; B23K 35/22; B23K 9/013; B23K 35/40; B23K 35/02; B23K 35/0216; B23K 35/0211; B23K 35/228
USPC ................................. 219/69.1, 68, 70, 146.22
See application file for complete search history.

(56) References Cited

U.S. PATENT DOCUMENTS

| 3,610,877 A | * | 10/1971 | Driscoll | 219/68 |
| 4,201,902 A | * | 5/1980 | Rieppel et al. | 219/68 |
| 5,587,203 A | * | 12/1996 | Soda et al. | 427/228 |

* cited by examiner

*Primary Examiner* — Geoffrey S Evans
(74) *Attorney, Agent, or Firm* — Rabin & Berdo, P.C.

(57) ABSTRACT

A gouging carbon rod using an aluminum or aluminum alloy material as its conducting material includes a carbon rod unit, which has an elongated hollow main body internally defining a central space portion and having a first and a second open end; an aluminum/aluminum alloy unit, which is formed by high-pressure injection molding a molten aluminum or aluminum alloy material in the central space portion of the main body via the second open end, such that the aluminum/aluminum alloy unit so formed includes a shielded section located in the central space portion and an exposed section projected from the main body via the second open end. In this manner, the energy, time and labor costs for binding the aluminum material to the carbon rod are lowered, compared to the conventional carbon rod produced by metal thermal spraying technique, and the problem of uneven thickness of metal coating is solved.

8 Claims, 6 Drawing Sheets

GOUGING CARBON ROD

FIELD OF THE INVENTION

The present invention relates to a carbon rod for use in the arc gouging process, and more particularly to a gouging carbon rod that uses an aluminum or aluminum alloy material to replace the electroplated copper as the primary conducting material thereof.

BACKGROUND OF THE INVENTION

Most of the currently available carbon rods for arc gouging process use electroplated copper as their primary conducting material. As can be seen in FIG. 1, in a conventional way of forming a gouging carbon rod, every carbon rod 10 is coated with an electroplated copper layer 12 by electroplating copper plates 11 to the carbon rod 10, so that the produced carbon rod or electrode has reduced electrical resistance to conduct a high current needed to generate arc. However, smoke hazardous to human body will be produced in the process of burning copper at high temperature.

Further, the existing electroplating copper process also produces a large quantity of copper ion-containing waste water and acidic gas, which tend to cause heavy metal pollution in water, soil and air. Therefore, pollution control facilities must be correspondingly provided in response to the increasing sense of environmental protection. Such pollution control facilities will doubtlessly increase the manufacturing cost of the gouging carbon rod.

Since the conventional way of electroplating copper to the carbon rod has the disadvantage of being hazardous to the living environment and human body, aluminum is used to replace copper in producing the carbon rod. In view that the aluminum material could not be adhered to the carbon rod by way of electroplating, a so-called metal thermal spraying technique is currently used for spray coating high-temperature molten aluminum material on the surface of the carbon rod. However, with the metal thermal spraying technique, the sprayed aluminum coating has to be re-processed by re-melting it at a temperature close to the melting point of aluminum. That is, the current metal thermal spraying technique will consume tremendous power energy and is inconvenient to use.

Another type of gouging carbon rod with aluminum coating has been developed in an attempt to overcome the problem of large power energy consumption. To produce this type of gouging carbon rod, first coat an aluminum material on the surface of the carbon rod by way of the metal thermal spraying technique, and then sinter the aluminum-coated carbon rod at a temperature below the melting points of metals. A disadvantage of the conventional metal thermal spraying technique is that only a considerably small quantity of aluminum material can be adhered to the surface of the carbon rod via this technique and therefore forms waste of metal material. In addition, the aluminum material tends to oxide, resulting in poor adhesion between the coated metal layer and the carbon rod surface and higher electrical resistance of the carbon rod. Under these circumstances, the carbon rod is easily consumed to have short service life. Further, the sintering process also consumes additional power energy and is therefore not economical for use.

To overcome the difficulties in using aluminum as the conducting material of the carbon rod, there is developed an extrusion molding method, in which a conductive metal material is coated with a mixture of artificial graphite, which serves as a major material, and binders, such as coal tar and asphalt, before being sintered at a temperature lower than melting points of metals in an inactive environment. However, the currently available carbon rod electrode requires a sintering temperature higher than 1000° C., which is higher than the melting points of most metals. On the other hand, a carbon rod electrode sintered at lower temperature would have higher electrical resistance. And, the sintering process conducted in an inactive environment filled with an inert gas requires high cost and does not support continuous production.

There is also developed a gouging carbon rod formed by inserting a metal rod into a carbon rod and then sintering the assembly at a temperature lower than melting points of metals. Due to the sintering temperature lower than metal melting points, the produced gouging carbon rod has the problem of insufficient adhesion between the metal and the carbon rod.

In view of the above drawbacks and disadvantages in the existing carbon rods, it is necessary to develop new manufacturing method and structure for the carbon rod, particularly the gouging carbon rod.

SUMMARY OF THE INVENTION

A primary object of the present invention is to provide a gouging carbon rod that uses an aluminum or aluminum alloy material to replace the electroplated copper for serving as a primary conducting material of the carbon rod.

Another object of the present invention is to provide a gouging carbon rod that is formed by molding a molten aluminum or aluminum alloy material in a hollow carbon rod through high-pressure injection molding, so that the power energy consumption for adhering the aluminum or aluminum alloy material to the carbon rod is reduced compared to the conventional metal thermal spraying technique, and the problems of low amount of metal adhered to the surface of carbon rod and uneven metal coating thickness in the conventional metal thermal spraying technique are also overcome.

A further object of the present invention is to provide a gouging carbon rod that can be produced with reduced metal consumption as well as reduced time and labor to largely lower the manufacturing cost without producing intense light, noise and metal dust that cause pollution to the living environment and are hazardous to human body.

To achieve the above and other objects, the gouging carbon rod according to the present invention includes a carbon rod unit and an aluminum/aluminum alloy unit bound to each other. The carbon rod unit has an elongated hollow main body internally defining a central space portion. The central space portion extends from a first end to a second end of the main body, so that a first and a second open end are formed at the first and the second end, respectively, of the main body. The aluminum/aluminum alloy unit is formed and bound to the carbon rod unit by high-pressure injection molding a molten aluminum or aluminum alloy material in the central space portion of the main body via the second open end. After the molten aluminum or aluminum alloy material is cooled and hardened, the aluminum/aluminum alloy unit so formed includes a shielded section located in the central space portion and an exposed section projected from the main body via the second open end. In a preferred embodiment, the gouging carbon rod so formed has an electrical resistance value ranged between 0.1 and 1.0 mΩ-cm, and the exposed section of the aluminum/aluminum alloy unit has a length ranged between 2 and 4 mm.

According to the present invention, the carbon rod unit is formed by shaping a mixture of artificial graphite, petroleum coke, carbon black, and binders using an extrusion machine and then sintering the shaped mixture at a temperature higher than 1000° C. The carbon rod unit so formed preferably has a density ranged between 1.76 and 1.84 g/cm$^3$, and a structural strength ranged between 500 and 850 kgf/cm$^2$. Also according to the present invention, the aluminum/aluminum alloy unit contains more than 80 wt % of pure aluminum, and has a weight about 10~40% of a whole weight of the gouging carbon rod.

Compared to the conventional gouging carbon rod that uses the metal thermal spraying technique to bind the aluminum material thereto, the present invention is characterized in that the aluminum/aluminum alloy unit is formed by high-pressure injection molding a molten aluminum or aluminum alloy material in the central space portion of the carbon rod unit, which reduces the power energy consumption needed for binding the aluminum material to the carbon rod and overcomes the problems of low metal adhering amount and uneven metal coating thickness. Further, in the high-pressure injection molding process, no intense light, noise and metal dust would be produced to pollute the living environment or endanger human body. With the present invention, the time and labor costs needed for forming and binding the carbon rod unit and the aluminum/aluminum alloy unit to each other are reduced and less metal is consumed to largely lower the manufacturing cost of the present invention.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings.

Figure 1:
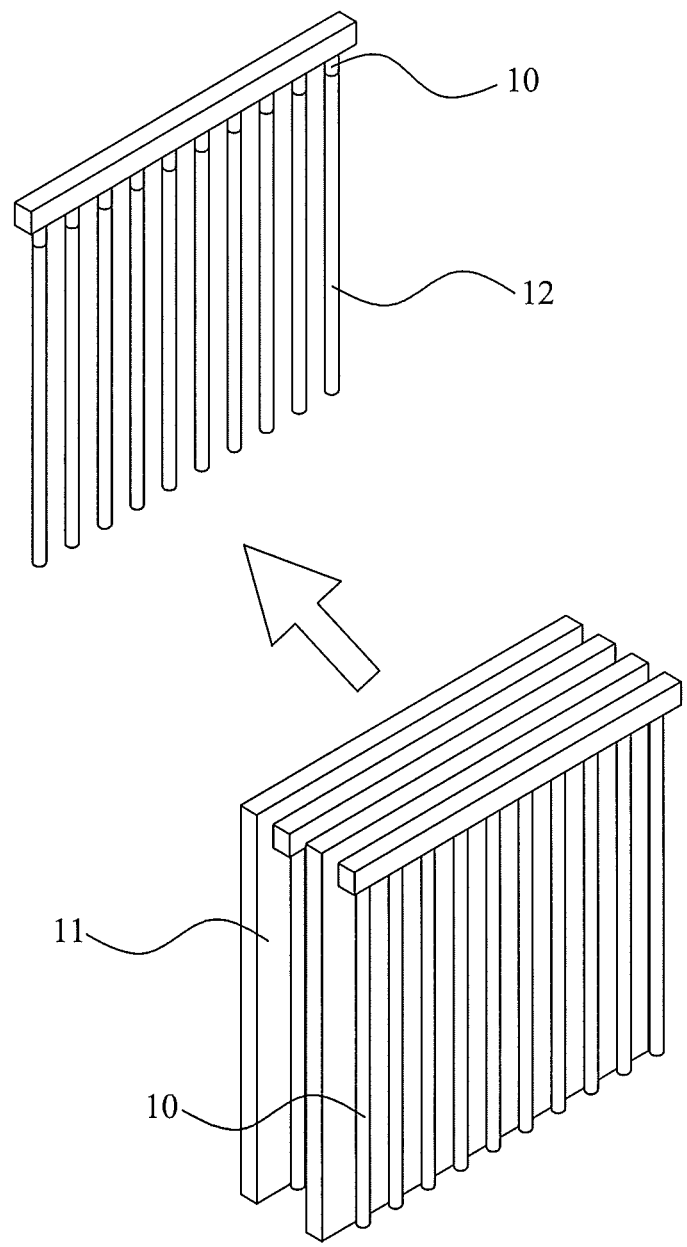
FIG. 1 is a schematic view showing a conventional manner of electroplating copper to carbon rods.
Figure 2:
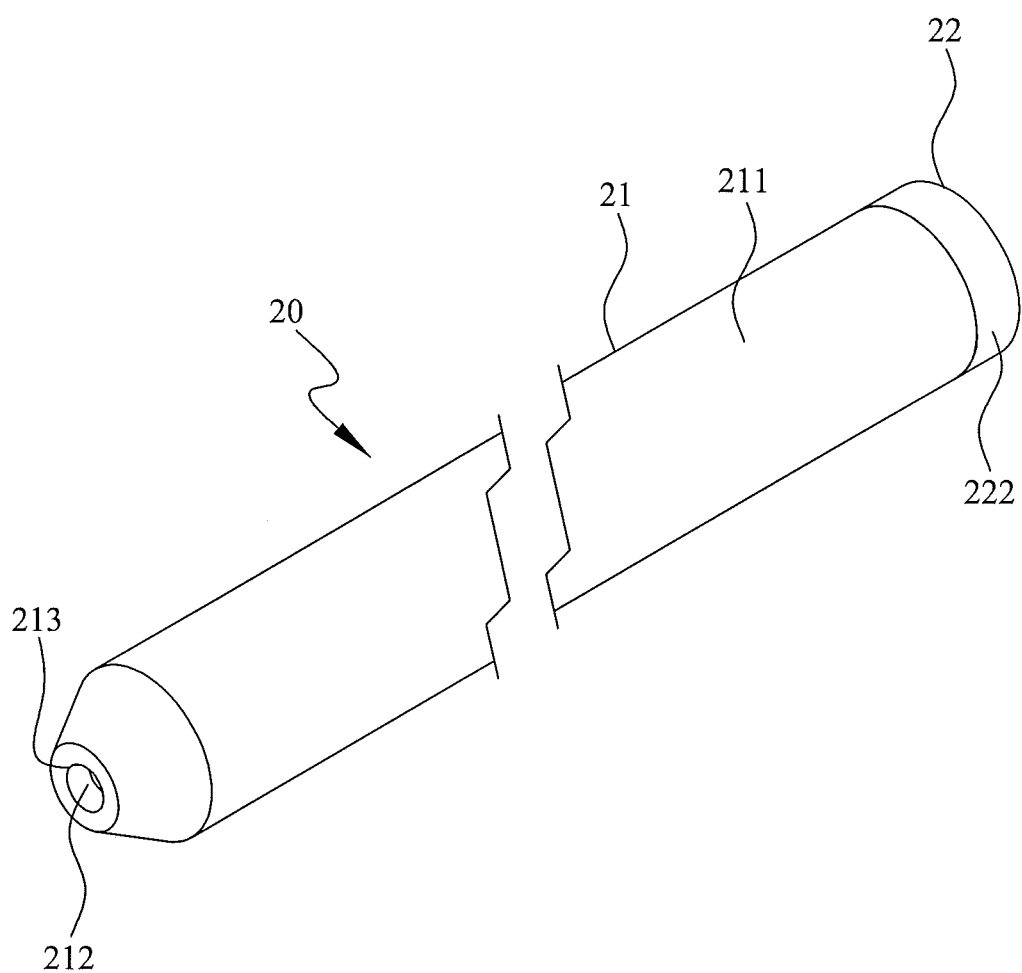
FIG. 2 is a perspective view of a gouging carbon rod according to an embodiment of the present invention.
Figure 3:
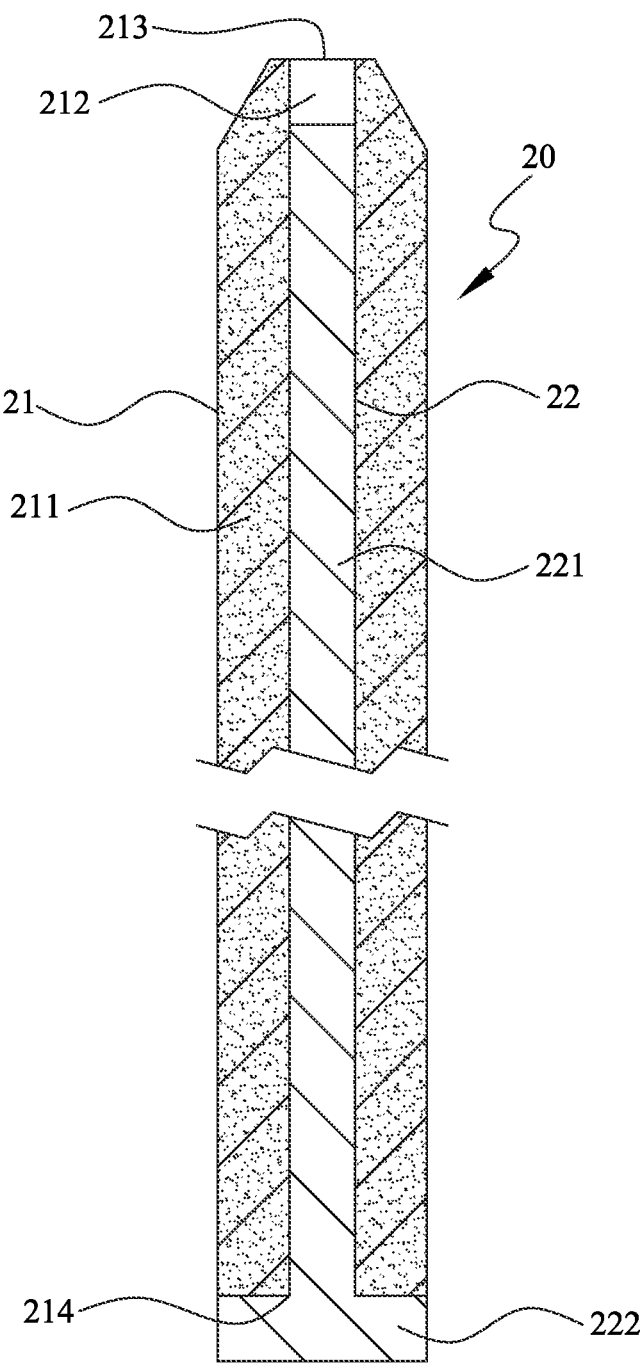
FIG. 3 is a sectional view of FIG. 2.
Figure 4:
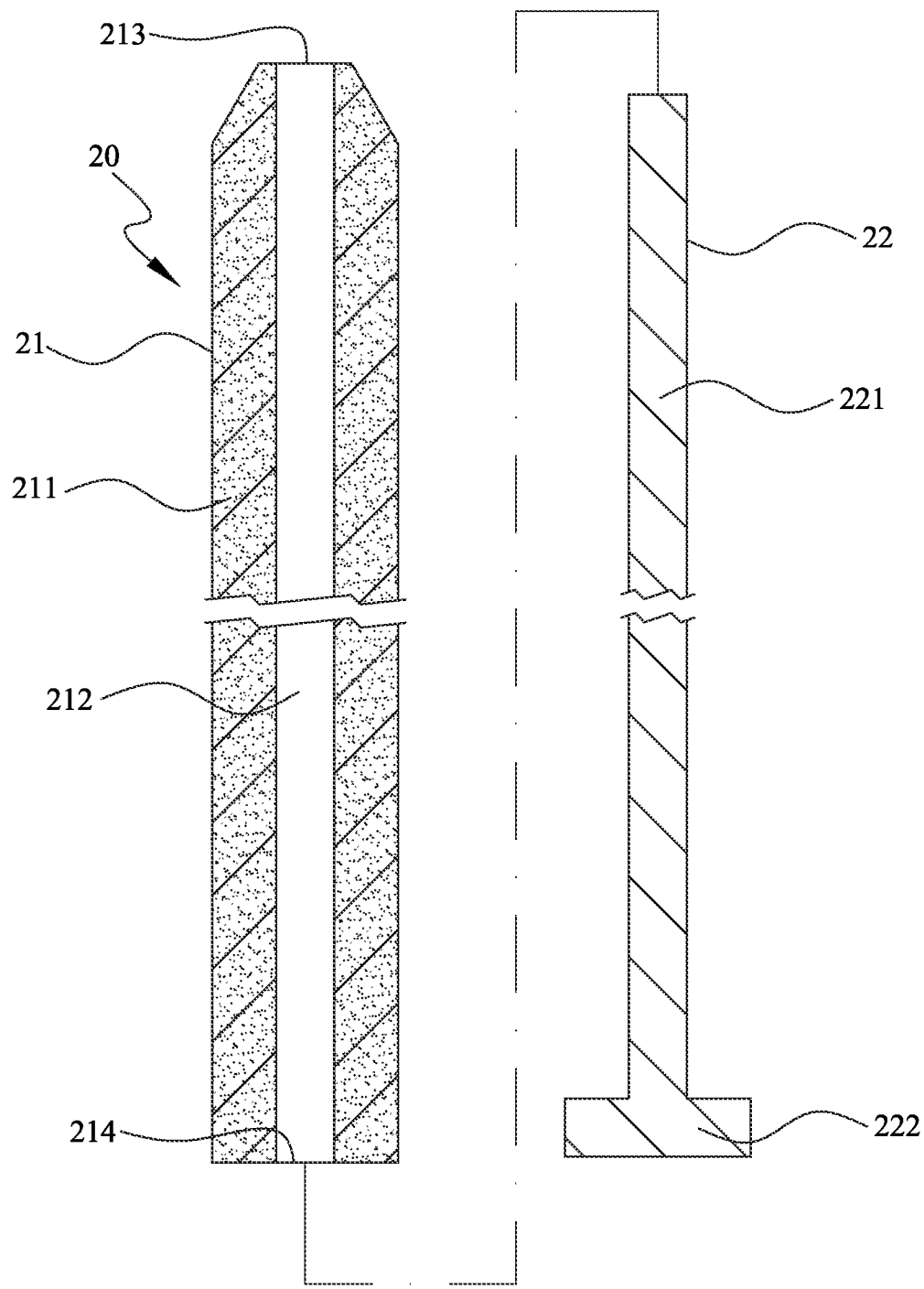
FIG. 4 is an exploded view of FIG. 3.

Please refer to FIGS. 2 to 4. A gouging carbon rod 20 according to a preferred embodiment of the present invention mainly includes a carbon rod unit 21 and an aluminum or aluminum alloy unit 22.

The carbon rod unit 21 has an elongated hollow cylindrical main body 211 internally defining a cylinder-shaped central space portion 212, such that a first open end 213 is formed at a first end or head end of the main body 211 and a second open end 214 is formed at a second end or tail end of the main body 211. The central space portion 212 is communicable with external environment via the first and the second open end 213, 214.

The aluminum/aluminum alloy unit 22 is formed by injecting under pressure a molten aluminum or aluminum alloy material into the central space portion 212 of the carbon rod unit 21 via the second open end 214. When the molten aluminum or aluminum alloy material is cooled and hardened, a cylinder-shaped shielded section 221 is correspondingly molded in the central space portion 212 of the main body 211, and an exposed section 222 is formed to project from the second open end 214 of the main body 211. The exposed section 222 has an external diameter the same as that of the carbon rod unit 21, and has a length about 2 to 4 mm to prevent the carbon rod unit 21 from breaking during the high-pressure injection molding process.

In the present invention, the carbon rod unit 21 is made of a mixture of artificial graphite, petroleum coke, carbon black and binders. The mixture is shaped with an extrusion machine and then sintered at a temperature higher than 1000° C. to form the carbon rod unit 21 with increased density and upgraded structural strength. According to the present invention, the carbon rod unit 21 has a density ranged between 1.76 and 1.84 g/cm$^3$ as well as a structural strength ranged between 500 and 850 kgf/cm$^2$ to sufficiently bear the pressure applied thereto when the molten material for forming the aluminum/aluminum alloy unit 22 is injected into the central space portion 212 at high pressure.

Since the aluminum/aluminum alloy unit 22 is formed by high-pressure injection molding the molten aluminum or aluminum alloy material thereof in the central space portion 212 of the carbon rod unit 21, a tight adhesion between the metal material, i.e. the aluminum/aluminum alloy material, and the carbon rod can be obtained. According to the present invention, the aluminum/aluminum alloy unit 22 must contain more than 80 wt % of pure aluminum to avoid the forming of metal that is hazardous to the ecological environment and human body. In the present invention, the aluminum/aluminum alloy unit 22 has a weight about 10~40% of the whole weight of the gouging carbon rod 20, so as to enable conduction of a large current needed for arc discharge.

Figure 5:
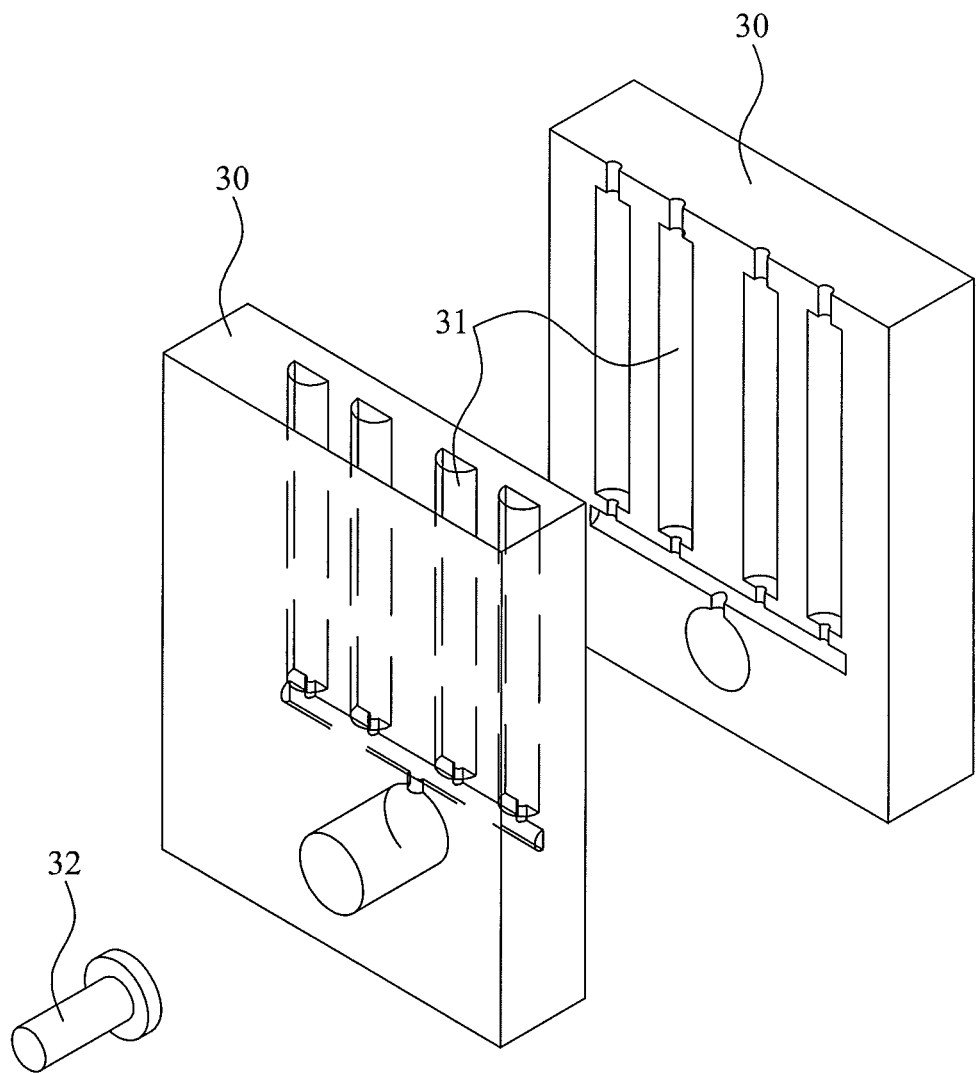
FIG. 5 is a schematic view showing the manner of high-pressure injection molding an aluminum or aluminum alloy material in a carbon rod to form the gouging carbon rod of the present invention.

Please refer to FIG. 5. To manufacture the gouging carbon rods 20 of the present invention, first fit a plurality of carbon rod units 21 in a molding space 31 defined between two closed mold halves 30 and then connect an external injection piston 32 to the closed mold halves 30, so as to inject under pressure the molten aluminum or aluminum alloy material into the carbon rod units 21 that have already been fitted in the two closed mold halves 30. Allow the molten aluminum or aluminum alloy material to cool in the central space portions 212 and form a plurality of aluminum/aluminum alloy units 22 integrally bound to the carbon rod units 21. The aluminum/ aluminum alloy units 22 so formed respectively include a shielded section 221 located in the central space portion 212 and an exposed section 222 projected from the second open end 214, as having been described above. The gouging carbon rod 20 manufactured in the above manner has a resistance value of 0.1~1.0 mΩ-cm to provide good electrical conductivity.

A performance comparison of the gouging carbon rod 20 according to the present invention with the existing gouging carbon rod manufactured using the metal thermal spraying technique, based on the metal removal rate thereof, is shown in the following Table 1:

TABLE 1

| | Carbon Rod Specification | | | |
|---|---|---|---|---|
| | Φ9.5 mm | | Φ13.0 mm | |
| | Manufacturing Technique | | | |
| | Metal Thermal Spraying Technique | Present Invention | Metal Thermal Spraying Technique | Present Invention |
| Discharge Current (A) | 600 | 600 | 1000 | 1000 |
| Length of Carbon Rod Before Discharging (cm) | 30.54 | 30.65 | 35.50 | 35.65 |
| Length of Carbon Rod After Discharging (cm) | 24.5 | 23.9 | 28.6 | 28.5 |
| Length of Carbon Rod Consumed (cm) | 6.04 | 6.75 | 6.90 | 7.15 |
| Weight of Iron Removed (g) | 218 | 278 | 485 | 646 |
| Metal Removal Rate* (g/cm) | 36.1 (100%) | 41.2 (114%) | 70.3 (100%) | 90.3 (129%) |

*Metal removal rate is the weight of iron that can be removed by per unit of length of the gouging carbon rod.

In addition, the currents suitable for operating the gouging carbon rod 20 according to the present invention to avoid incandescent phenomenon are shown in the following Table 2:

TABLE 2

| | OD of Carbon Rod (mm) | | | | | | |
|---|---|---|---|---|---|---|---|
| | Φ6.5 | Φ8.0 | Φ9.5 | Φ11.0 | Φ13.0 | Φ16.0 | Φ19.0 |
| Suitable current (A) | 200-250 | 250-350 | 400-550 | 450-600 | 700-900 | 1000-1200 | 1200-1400 |

Figure 6:
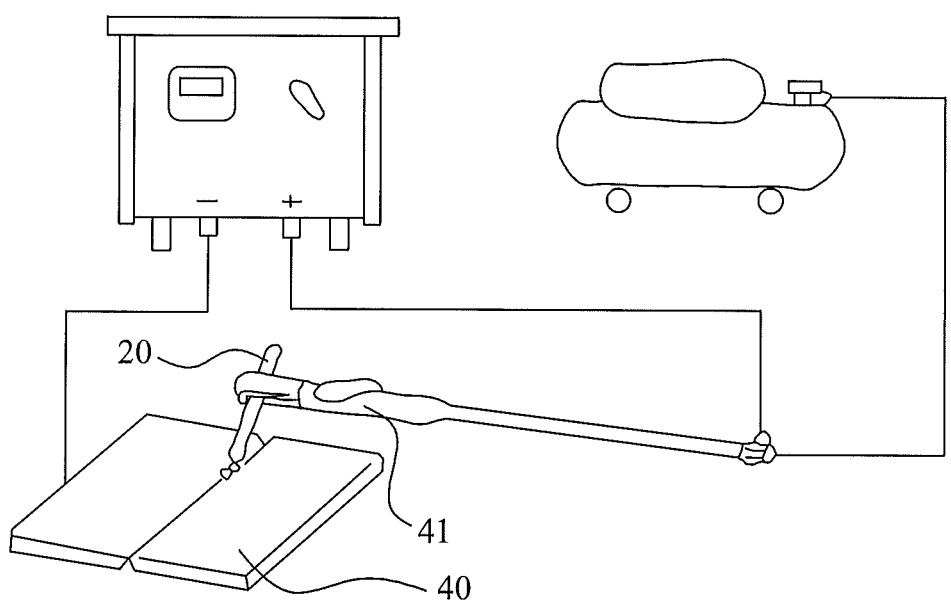
FIG. 6 shows the use of the gouging carbon rod of the present invention in an arc gouging process.

FIG. 6 shows the use of the gouging carbon rod 20 of the present invention in an arc gouging process. An arc is generated between the carbon rod unit 21 and a metal material 40, which may be iron, cast steel and the like. A spray welding torch 41 holding the gouging carbon rod 20 sprays high-pressure air along the carbon rod unit 21 to remove molten metal while the high-temperature arc melts the metal 40, so as to form a groove on the metal material 40 or cut it into two parts.

According to the present invention, less power energy is consumed in the process of melting the material for forming the aluminum/aluminum alloy unit to thereby enable lowered manufacturing cost and increased economic benefit, compared to the conventional carbon rod formed with the metal thermal spraying technique. Further, by forming the aluminum/aluminum alloy unit via high-pressure injection molding, it is able to obtain a high-density metal layer in the carbon rod unit and the metal layer contains less metal oxides. Moreover, with the present invention, the intense light, noise and metal dust produced in the conventional metal thermal spraying technique and hazardous to human body and external environment can be avoided. Meanwhile, the time and labor needed for binding the aluminum material to the carbon rod is reduced and the metal material consumed is decreased to largely lower the manufacturing cost of the gouging carbon rod.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A gouging carbon rod, comprising:
a carbon rod unit having an elongated hollow main body internally defining a central space portion, and the central space portion being extended from a first end to a second end of the main body, such that a first open end and a second open end are formed at the first and the second end, respectively, of the main body; and
an aluminum or aluminum alloy unit being formed and bound to the carbon rod unit by die-casting molding means for forming the aluminum or aluminum alloy unit including a shielded section located in the central space portion, and an exposed section projected from the main body via the second open end, the exposed section having an external diameter that is the same as an external diameter of the carbon rod unit.

2. The gouging carbon rod as claimed in claim 1, wherein the carbon rod unit is formed by shaping a mixture of artificial graphite, petroleum coke, carbon black and binders using an extrusion machine and then sintering the shaped mixture at a temperature higher than 1000° C.

3. The gouging carbon rod as claimed in claim 1, wherein the carbon rod unit has a density ranged between 1.76 and 1.84 g/cm$^3$.

4. The gouging carbon rod as claimed in claim 1, wherein the carbon rod unit has a structural strength ranged between 500 and 850 kgf/cm$^2$.

5. The gouging carbon rod as claimed in claim 1, wherein the aluminum or aluminum alloy unit contains more than 80 wt % ref pre aluminum.

6. The gouging carbon rod as claimed in claim 1, wherein the aluminum or aluminum alloy unit has a weight about 10-40% of a whole weight of the gouging carbon rod.

7. The gouging carbon rod as claimed in claim 1, wherein the gouging carbon rod has an electrical resistance ranged between 0.1 and 1.0 mΩ-cm.

8. The gouging carbon rod as claimed in claim 1, wherein the exposed section of the aluminum or aluminum alloy unit has a length ranged between 2 and 4 mm.

* * * * *